United States Patent [19]

Guitaut et al.

[11] Patent Number: 4,601,092
[45] Date of Patent: Jul. 22, 1986

[54] METHOD OF FIXING A RAIL ON A SUPPORT OF TIMBER OR CAST OR MOULDED MATERIAL

[75] Inventors: François P. Guitaut, Ville d'Avray; Claude M. Cazenave, Fourqueux, both of France

[73] Assignee: Sateba International S.A., Paris, France

[21] Appl. No.: 733,735

[22] Filed: May 14, 1985

Related U.S. Application Data

[63] Continuation of Ser. No. 423,106, Sep. 24, 1982, abandoned.

[30] Foreign Application Priority Data

Sep. 21, 1982 [FR] France ............................ 8215868

[51] Int. Cl.⁴ ..................... B23P 19/04; F16B 13/04; F16B 37/16
[52] U.S. Cl. ...................................... 29/456; 411/17; 411/438
[58] Field of Search ..................... 29/456; 411/17, 438

[56] References Cited

U.S. PATENT DOCUMENTS

| | | | |
|---|---|---|---|
| 730,585 | 6/1903 | Thiollier | 411/17 |
| 1,011,392 | 12/1911 | Thiollier | 411/438 |
| 3,344,501 | 10/1967 | Kulzer | 29/456 |
| 4,077,101 | 3/1978 | Wallace | 29/456 |
| 4,227,290 | 10/1980 | Wallace | 29/456 |

FOREIGN PATENT DOCUMENTS

| | | |
|---|---|---|
| 965043 | 5/1957 | Fed. Rep. of Germany. |
| 482480 | 3/1917 | France. |
| 548162 | 1/1923 | France. |
| 601104 | 2/1926 | France. |
| 619543 | 4/1927 | France. |
| 681673 | 5/1930 | France. |
| 740037 | 1/1933 | France. |
| 967987 | 11/1950 | France. |
| 1037007 | 9/1953 | France. |
| 1042330 | 10/1953 | France. |

Primary Examiner—Mark Rosenbaum
Assistant Examiner—Steven Nichols
Attorney, Agent, or Firm—Sandler & Greenblum

[57] ABSTRACT

A method and a device for attaching a rail on a timber support. The device includes a helically threaded fastener adapted to be screwed into a helically threaded borehole in the support after a rectangular metal insert is positioned in a rectangular opening at the periphery of the borehole. The borehole is sufficiently large that the fastener only contacts the timber support via contact with the insert. The rectangular opening is longer than the insert so that there is radial play between the insert and one end of the insert. The other end of the insert is adapted to contact a sloped side of the thread of the fastener. As the fastener is screwed into the borehole, the sloped side of the fastener presses the insert parallel to and perpendicular to the screwing axis of the fastener. As a result, the insert elastically expands parallel to and perpendicular to the screwing axis. Because the expansion perpendicular to the screwing axis is less than the radial play, no radial forces act on the timber support. Rather the timber support is only compressed parallel to the screwing axis thereby preventing the timber support from splintering.

44 Claims, 7 Drawing Figures

FIG_4

FIG_5

FIG_6

METHOD OF FIXING A RAIL ON A SUPPORT OF TIMBER OR CAST OR MOULDED MATERIAL

This is a continuation of application Ser. No. 423,106 filed Sept. 24, 1982 now abandoned.

The present invention is related to a method of fastening down a rail on a support of timber or cast or moulded material, more particularly to a method of fixing a rail to a tie of timber or re-constituted timber by means of fasteners screwed into the support.

BACKGROUND OF THE INVENTION

Rails, such as railroad rails, are traditionally fastened down to timber supports, typically timber ties, either directly, or indirectly with the interposition of a tie plate between the rail's foot and the timber support. To hold down the rail on its support, are used either non-threaded fasteners, such as spikes, or, more generally, screw threaded fasteners such as coachscrews. These screw threaded fasteners or coachscrews are screwed into appropriate holes previously drilled into the timber support.

At the end of a certain period of use or after several laying and lifting operations, the screw threaded fasteners tend to shear the fibers of the timber and as a result to compromise the solidity of the fixation of rail on its support.

While this problem of the stability of the screwed-in fasteners in the course of time is less critical when high quality hardwood supports are used, it should be stated that, in the face of a world wide shortage of such hardwood timbers, more and more lower quality woods are even softwood timbers tend to be used.

PRIOR ART

Various attempts have already been made to improve the stability of screwed-in fasteners in timber supports.

Thus with new supports of softwood, it has been proposed to place, in the most stressed regions of the support, elements formed of a higher quality timber, such as rail support plates on the support or hardwood plugs. These solutions, which are costly in labor, have only known a very limited development.

As far as new supports of hardwood timber are concerned, it has been proposed to improve the mechanical characteristics of the timber around the periphery of the drilled holes, for example by using capsules containing products which when mixed form a material whose properties are similar to those of the timber. There has also been proposed, in the case of screwed-in fasteners, a bolted connection to an anchorage instead of direct screwing into the timber.

In the case of hardwood or softwood supports which have already been used, and in which certain holes already drilled have as a result of this fact lost all or part of the gripping possibilities which they can offer to the fasteners, different solutions have already been proposed. All these solutions propose, after chiselling-out the wood portions which have lost their mechanical properties, to re-constitute a drilled hole which is compatible with the screwed-in fastener. Thus, it has already been proposed to use wedges or shims which only affect a portion of the periphery of the drilled hole, to use driven-in metal linings or, again, to use products the mixture of which in-situ enables voids to be filled with a product having characteristics approaching those of the timber.

In addition to the solutions set out above, there is always a possiblity of forming and using new drilled holes. But this solution, of relatively convenient application in the case of direct seating (without tie plates) leads to waste of the drilled holes where tie plates which only present the strictly necessary number of bores are used (necessitating displacement of the plate).

In fact, research for solutions of the problem of the stability of the screwed-in fasteners in their timber supports has for a long time been characterised by a certain empirical approach and this problem has only been considered in practice under two aspects, i.e. repair in position in the track without displacing the support, and rehabilitation of a previously laid support in the repair shop.

In all cases, these solutions are costly in labor and as a result limit the work to contexts in which the cost of a new support may be considered to be high as compared with the of the labor necessary for the repair to be carried out on the support which has already been used.

Besides traditional timber supports, supports of cast or moulded material have also been proposed, for example supports of reinforced concrete or supports of re-constituted wood, the latter being formed by moulding from organic elements of small dimensions, such as wood chips, with or without the addition of a binder.

The problems set by the stability of the holding power of the fasteners in supports of moulded material of the reconstituted wood type, and the known solutions, are substantially the same as for timber supports. These solutions present therefore substantially the same disadvantages as in the case of timber supports.

In the case of concrete supports, the stability of the screwed-in fasteners is improved by inserting an imbedded liner, but this solution does not allow any deformation of the liner during screwing-in of the fastener, the latter co-operating essentially with the concrete.

OBJECTS OF THE INVENTION

The principal object of the invention is to improve the stability of screwed-in fasteners in rail supports made of timber or of cast or moulded material.

Another object of the invention is to provide a fastening giving the possibility of a high number of laying and lifting operations without reducing the quality of the holding down power of the rail onto the support of wood or cast or moulded material.

Another object of the invention is to provide a fixture which can be put in place without the necessity of any monitoring and without risking misuse.

Another object of the invention is to provide a fixture giving, during static pull-out tests with the aid of an extractometer, results at least equal to and if possible better than those obtained with the same qualities of supports by conventional types of fasteners to wood or cast or moulded material.

SUMMARY OF THE INVENTION

The fastening method forming the subject of the invention is intended to be applied in the first place to new hardwood timber supports used in railroad switches, for open deck steel structures, for tight curves in which the gauge is difficult to maintain, and, in a general manner, in track sections where renewal of the rails is frequent as well as in track zones subject to frost upheaval. However, this method may also be applied for all the other track sections.

Furthermore, the fastening method of the invention may be applied to softwood rail supports where it enables performances to be obtained equivalent to those hitherto obtained with screwed-in fasteners in hardwood supports.

Furthermore, the fixing method of the invention may be applied to timber supports which have already undergone track use, the rehabilitation of the supports than taking place in the workshop.

Besides, the fastening method of the invention may also be applied to cast or moulded material supports, especially to supports of reconstituted wood or again to supports of reinforced concrete.

The method of the invention gives the possiblity of fastening a rail to a support of timber or of cast or moulded material by means of at least one fastener screwed into the support, the said fastener presenting a cylindrical core and a screw thread of constant section and pitch.

This method comprises essentially the steps consisting in positioning in the support and at the fixing position a helical metal insert formed from a flat strip of rectangular section which is wound to form a helix having, in its unstressed state, an internal diameter equal to the diameter of the core of the fastening and a pitch equal to that of the fastening, the positioning of the insert being effected by means of a mandrel capable of holding the insert in a radially expanded configuration relative to its unstressed configuration; in withdrawing the mandrel, thus causing the return of the insert towards its unstressed configuration; and in screwing into the insert a fastening to fasten the rail to the support.

To ensure an optimum stability of the insert in the support, the flat strip serving to form the insert should be wound in such a manner that any plane passing through the axis of the helix cuts the strip perpendicular to its initial length.

The invention also provides that the fastening method comprises further the step consisting of forming in the support before the fastening is screwed into it, a chamfer or undercut to increase rectangular section intended for the insert, so as to permit the later passage of the thread of the fastening.

In the case of a timber support, the steps of the method consist in forming in the support a cylindrical hole of diameter corresponding to that of the core of the fastening and a helical screw thread in the periphery of the cylindrical bore, the helical screw thread being in the form of a groove of rectangular section of which the height is equal to the thickness of the metal strip forming the helical insert and of which the radial depth is equal to the width of the metal strip increased by an increment, in then placing in the helical screw thread the metal insert which is held in its radially expanded configuration by the mandrel; then withdrawing the mandrel and screwing a fastening into the insert.

The invention equally envisages, in the case of a timber support, that the rectangular section of the screw threading is increased its lower angle nearer the axis of the bore by a chamfer, the dimensions of which permit the subsequent passage of the screw thread of the fastening.

In the case of a support of cast or moulded material, the steps of the method consist in fixing on the mould for making the support, the mandrel which maintains the metal insert in its radially expanded condition; in flowing into the mould the material to constitute the support; in withdrawing the mandrel after drying or setting of the material forming the support, thus causing the return of the insert towards its unstressed configuration; and in screwing a fastening into the insert.

The mandrel which maintains the insert in its configuration permits also to form, during moulding, the said chamfer which extends the rectangular section of the helical insert, to permit the subsequent passage of the screw thread of the fastener.

In one embodiment, the invention comprises a method for attaching a rail on an upper, substantially planar surface of a timber support by means of at least one fastener and a tie plate. The fastener is adapted to be screwed into the support along a predetermined screwing axis. The fastener comprises a shank having a predetermined radius and extending around a longitudinal axis coincident with the screwing axis. The shank comprises a helical thread having a section comprising two sides that are sloped with respect to the longitudinal axis of the shank. The section of the helical thread has a predetermined maximum radius with respect to the longitudinal axis. The fastener further comprises a head adapted to rest on the bottom of a flange of a rail. The tie plate comprises at least one hole, an upper surface, and a substantially planar lower surface adapted to rest flatly on the upper surface of the timber support. The at least one hole passes through the tie plate from the lower surface to the upper surface.

The method for attaching the rail to the support comprises the steps of forming a borehole in the upper surface of the support about the screwing axis. The borehole that is formed has an inner radius substantially equal to the predetermined radius of the shank of the fastener. The borehole also comprises a periphery. Next, a helical tapping is formed in the periphery of the borehole. The tapping comprises a thread comprising a section. The pitch of the thread of the helical tapping substantially corresponds to the pitch of the thread of the fastener. The section of the tapping comprises an upper portion and a lower portion, the upper portion being substantially rectangular and defined by first and second ends substantially parallel to the screwing axis. The second end is furthest from the screwing axis. The lower portion is contiguous with the upper portion and comprises a first portion and a second portion, the first portion being substantially rectilinear and parallel to the screwing axis and spaced apart from the screwing axis by a distance intermediate between the maximum radius of the thread of the fastener and the second end of the upper portion of the tapping. The second portion of the lower portion has a configuration permitting the placement of the section of the thread of the fastener in the lower portion of the helical tapping.

The method further comprises the step of screwing an elastic helical metal insert in the helical tapping. The metal insert comprises a flat metal strip having a cross-section that is substantially rectangular. The metal insert is adapted to be placed in a stressed and an unstressed, rest condition. The pitch of the helical metal insert substantially corresponds to the pitch of the thread of the fastener. The insert comprises a substantially rectangular section having a height substantially equal to the height of the upper portion of the helical tapping and having a length greater than the distance between the periphery of the shank and the first portion of the lower portion of the tapping, but having a length less than the distance between the periphery of the shank and the second end of the upper portion of the tapping.

The method further comprises the step of positioning the helical metal insert in the upper portion of the section of the thread of the helical tapping so that the insert is spaced in the radial direction from the second end of said upper portion of the thread of the tapping so as to produce radial play between the helical metal insert and the upper portion, and so that the insert contacts the sloped side of the fastener when the fastener is screwed in the borehole.

The method further comprises the step of positioning the lower surface of the tie plate flatly against the upper surface of the support so that the screwing axis passes through the hole in the tie plate. The method further comprises the step of placing the flange of the rail on the upper surface of the tie plate and passing the shank of the fastener through the hole in the tie plate. The method further comprises the step of screwing the fastener into the borehole of the timber support by engaging the thread of the fastener immediately below the helical metal insert in the lower portion of the thread of the helical tapping until the head of the fastener presses on the flange of the rail, until the flange presses against the lower surface of the tie plate, until the tie plate rests on the timber support, and until the sloped portion of the fastener presses against the insert.

Next, the fastener is screwed farther in the timber support in a limited manner, so that this continued screwing the helical metal insert elastically radially expands the insert to an extent less than or at most equal to the radial play, and compresses the timber of the support between the helical metal insert and the lower surface of the tie plate in a direction parallel to the screwing axis without applying radial forces to the timber of the support.

The method further comprises a step of screwing the fastener in the borehole along a screwing axis secant with and perpendicular to the upper surface of the support. The shank of the fastener is cylindrical in shape and is defined by a cylinder of revolution having a longitudinal axis and a predetermined radius. The angle that the sloped sides form with the longitudinal axis is constant. The shape and dimensions of a cross-section of a section of the thread of the fastener taken along a plane passing through the screwing axis at one point therealong is the same for all cross-sections taken along all planes passing through the screwing axis at all points therealong. The thread of the fastener has a constant pitch, and the head of the fastener comprises an annular shoulder extending symmetrically around the longitudinal axis of the shank. The shape and dimenions of a cross-section of the section of said thread of the tapping taken along a plane passing through the screwing axis at one point therealong is the same for all cross-sections taken along all planes passing through the screwing axis at all points therealong.

The lower surface of the tie plate comprises at least one annular zone entirely surrounding the at least one hole of the tie plate.

The step of forming the helical tapping in the timber support further comprises the steps of: forming a thread in the tapping having a constant pitch; defining an upper portion of the helical tapping by an upper generatrix, a lower generatrix, and a base generatrix; and defining the lower portion of the helical tapping by a base generatrix and a lower generatrix. The upper and lower generatrices are both substantially rectilinear and substantially perpendicular to the screwing axis and spaced apart by a predetermined height. The base generatrix is substantially rectilinear and substantially parallel to the screwing axis and is spaced from the screwing axis by a distance greater than the maximum radius of the thread of the fastener and by a distance substantially equal to the radius of a circular periphery of the annular zone of the lower surface of the tie plate. The base generatrix of the lower portion is substantially rectilinear and substantially parallel to the screwing axis and is spaced from the screwing axis by a distance intermediate between the maximum radius of the thread of the fastener and the distance separating the screwing axis from the base generatrix of the upper portion. The lower generatrix of the lower portion of the tapping has a configuration permitting the positioning of the section of the the thread of the fastener in the lower portion of the helical tapping.

The step of screwing an elastic helical metal insert in the tapping comprises the step of screwing an insert into the tapping that is adapted to be placed in a rest position in which the insert has a constant pitch and the shape and dimensions of cross-sections taken along planes passing through the screwing axis at different points along the screwing axis are the same. The section of the insert is defined by an upper generatrix, a lower generatrix, an interior radial generatrix, and an exterior radial generatrix. The upper and lower generatrices are substantially rectilinear and substantially perpendicular to the screwing axis and are spaced apart from a distance substantially equal to the distance separating the upper and lower generatrices defining the upper portion of the helical tapping.

The interior radial generatrix is substantially rectilinear and parallel to the screwing axis and is spaced from the screwing axis at a distance substantially equal to the radius of the shank of the fastener. The exterior radial generatrix is substantially rectilinear and parallel to the screwing axis and is spaced from the screwing axis at a distance between the distance separating the screwing axis from the base generatrix of the lower portion of the section of the thread of the tapping and the base generatrix of the upper portion of the section of the thread of the tapping. Radial play is formed between the helical metal insert and the base generatrix of the upper portion of the section of the thread of the tapping when the helical metal insert is positioned in the upper portion of the section of the thread of the tapping.

The step of passing the shank of the fastener through the hole in the tie plate further comprises the step of passing the top of the shank of the fastener through the hole in the tie plate.

The step of continuing the screwing of the fastener further comprises the step of pressing the sloped portion portion of the fastener against the bottom of the helical metal insert thereby pressing the surface of the helical metal insert defined by the upper generatrix upwardly against the timber of the support and compressing the support between the helical metal insert and the annular zone of the lower surface of the tie plate in a direction parallel to the screwing axis in response to the elastic radial expansion of the insert.

In another embodiment, the method further comprises the steps of screwing the helical metal insert into the helical tapping of the support, placing the helical metal insert in a stressed condition from an unstressed condition in which, in the stressed condition, the insert is elastically radially expanded to an extent less than or equal to the radial play, and returning the metal insert to the unstressed condition before screwing in the fastener. The method defined above preferably produces a radial play at most equal to 0.5 mm. Additionally, the ratio between the pitch of the helical metal insert and twice the radius of the periphery of the borehole is preferably at most equal to 0.55. Finally, the ratio between the height of the metal insert and the pitch of the metal insert is preferably approximately equal to 0.25.

In another embodiment, the present invention relates to a device for attaching a rail on an upper, substantially planar surface of a timber support. The rail comprises a flange, and the support includes a borehole comprising a portion adapted to accommodate a shank of a fastener. The borehole further comprises a helical tapping comprising a substantially rectangular upper portion and a lower portion. The upper portion comprises along the length thereof an interior end and an exterior end. The exterior end is further from the shank of the fastener than the interior end in the radial direction. The lower portion also comprises an interior end and an exterior end along the length thereof.

The device comprises at least one fastener adapted to be screwed into the support along a predetermined screwing axis. The fastener comprises a shank having a predetermined radius, a longitudinal axis of symmetry coincident with the screwing axis, and a helical thread. The thread has a section comprising two sides sloped with respect to the longitudinal axis of the shank. The section has a maximum radius with respect to the longitudinal axis. The fastener further comprises a head adapted to be pressed against the flange of the rail. The predetermined radius of the fastener is substantially equal to the radius of the borehole, and the pitch of the thread of the fastener is substantially equal to the pitch of the helical tapping. The helical thread of the fastener has a shape permitting placement of the helical thread in the lower portion of the tapping.

The device further comprises a tie plate comprising an upper surface and a substantially planar lower surface adapted to rest flatly on the upper surface of the support. The plate further comprises at least one hole passing through the tie plate and having a radius sufficient so that the tie plate comprises means for receiving the fastener therethrough.

The device further comprises an elastic helical metal insert comprising a flat metal strip having a substantially rectangular cross-section which is adapted to be screwed into the helical metal tapping. The height of the insert is substantially equal to the height of the upper portion of the helical tapping and the length of the insert is less than the distance from the periphery of the shank to the exterior end of the upper portion of the helical tapping. The insert comprises an interior end portion and an exterior end portion. The exterior end portion is spaced farther from shank than the interior end portion. The insert is positioned in the upper portion so that the interior end portion of the insert contacts at least one sloped side of the fastener, and the exterior end portion is spaced from the exterior end of said upper portion of the helical tapping to produce radial play between the insert and the exterior end of said upper portion of said helical tapping.

The flange of the rail is adapted to be placed on the upper surface of the tie plate, and the shank of the fastener comprises means for engaging the hole of the tie plate and means for screwing in the borehole of the support. The thread of the fastener comprises means for engaging the lower portion of the helical tapping below the insert. The head of the fastener comprises means for pressing on the bottom of the flange of the rail, and the flange comprises means for resting on the tie plate. One of the sloped sides of the thread of the fastener comprises means for pressing the helical metal insert upwardly and radially, thereby pressing the insert upwardly, substantially parallel to the screwing axis against the timber support and thereby elastically radially expanding the insert and placing the insert into a stressed condition so that the timber of the support is compressed between the helical metal insert and the tie plate substantially parallel to the screwing axis without the application of radial forces to the timber of the support.

The head of the fastener preferably comprises an annular shoulder extending around the longitudinal axis of the shank and is adapted to press on the flange of the rail. The lower surface of the tie plate further comprises at least one annular zone surrounding the at least one hole of the tie plate on all sides thereof. In this embodiment, one of the sloped sides of the thread of the fastener comprises means for compressing the timber of the support between the helical metal insert and the annular zone of the lower surface of the tie plate substantially parallel to the screwing axis.

The predetermined screwing axis of the borehole is preferably secant with and substantially perpendicular to the upper surface of the support. Also the shank of the fastener is preferably cylindrical in shape and is defined by a cylinder of revolution having a predetermined radius and a longitudinal axis of symmetry coincident with the screwing axis. The sloped sides of the thread preferably form a constant angle with the longitudinal axis of the shank of the fastener and have a constant pitch. In addition, the shape and dimensions of a cross-section of the section of said thread of said tapping taken along a plane passing through the screwing axis at one point therealong is the same for all cross-sections taken along all planes passing through the screwing axis at all points therealong. In addition, the shape and dimensions of a cross-section of the section of said thread of said fastener taken along a plane passing through the screwing axis at one point therealong is the same for all cross-sections taken along all planes passing through all points along the screwing axis.

The angle and pitch of the sloped sides of the fastener are substantially equal to the angle and pitch of the thread of the helical tapping of the support, respectively. In addition, the insert has a constant pitch and the insert comprises a substantially rectangular section having a cross-section of the same shape and dimensions for all planes passing through the screwing axis at all points therealong. The pitch of the insert is substantially equal to the pitch of the thread of the fastener.

In another embodiment, the invention comprises the above described fastening device in combination with the timber support. In this embodiment, the upper portion of the helical tapping is defined by an upper generatrix, a lower generatrix, and a base generatrix. The upper and lower generatrices are both substantially rectilinear and substantially perpendicular to the screwing axis and are spaced apart by a predetermined height. The base generatrix is substantially rectilinear and substantially parallel to the screwing axis and is spaced apart from the screwing axis by a distance greater the maximum radius of the thread of the fastener and by a distance substantially equal to the radius of a circular periphery of the angular zone of the lower surface of the tie plate.

The lower portion of the helical tapping is contiguous with the upper portion and is defined by a base generatrix and a lower generatrix. The base generatrix of the lower portion is substantially rectilinear and parallel to the screwing axis and is spaced from the screwing axis at a distance intermediate between the maximum radius of the thread of the fastener and the distance separating the screwing axis from the base generatrix of the upper portion. The lower generatrix of the lower portion has a configuration permitting positioning of the section of the thread of the fastener in the lower portion of the helical tapping.

The section of the metal insert is defined by an upper generatrix, a lower generatrix, an interior radial generatrix, and an exterior radial generatrix. The upper and lower generatrices are substantially rectilinear and substantially perpendicular to the screwing axis and are spaced apart by a distance substantially equal to the distance separating the upper and lower generatrices defining the upper portion of the helical tapping. The interior radial generatrix is substantially rectilinear and parallel to the screwing axis and is spaced from the screwing axis at a distance greater than the radius of the shank of the fastener. The exterior radial generatrix is substantially rectilinear and substantially parallel to the screwing axis. This exterior radial generatrix is spaced from the screwing axis at a distance greater than the distance separating the screwing axis and the base generatrix of the lower portion of the tapping and less than the distance separating the screwing axis from the base generatrix of the upper portion of the tapping. The insert is positioned in the upper portion of the tapping and is of such dimensions so as to produce a radial play of the helical metal insert with respect to the base generatrix of the upper portion of the tapping.

The radial play produced by the fastening device is preferably less than 0.5 mm. In addition, the ratio of the pitch of the metal insert to twice the radius of the periphery of the borehole is preferably at most equal to 0.55. Also, the ratio of the height of the metal insert to the pitch of the metal insert is preferably approximately equal to 0.25.

In still another embodiment, the invention comprises a device for attaching a rail on an upper, substantially planar surface of the timber support. The device is adapted to be used with a rail comprising a flange, and with a timber support including a borehole. The borehole has a radius adapted to accommodate a shank of a fastener and a helical tapping comprising an upper portion and a lower portion. The upper portion of the tapping comprises along the length thereof an interior end and an exterior end. The exterior end is further from the shank than the interior end. The lower portion also comprises an exterior end and an interior end along the length thereof.

The device comprises at least one fastener adapted to be screwed into the support along the predetermined screwing axis. The fastener comprises a shank defined by a predetermined radius, and a longitudinal axis of symmetry coincident with the screwing axis. The fastener further comprises a helical thread comprising a section comprising at least one sloped side sloped with respect to the longitudinal axis of the shank of the fastener. This at least one sloped side has a maximum predetermined radius with respect to the axis of the shank. The predetermined radius of the shank is substantially equal to the radius of the borehole. The pitch of the thread of the fastener is substantially equal to the pitch of the helical tapping. The helical thread of the fastener has a shape permitting placement of the helical thread in the lower portion of the helical tapping.

The device also comprises an elastic helical metal insert adapted to be screwed into the helical tapping. The insert comprises a flat metal strip having a substantially rectangular cross-section. The insert is adapted to be placed in a rest position. In the rest position, the insert has a constant pitch and the shape and dimensions of a cross-section of the insert taken along a plane passing through the screwing axis is the same for all cross-sections of the insert taken through all planes passing through the screwing axis at all points therealong. The pitch of the helical metal insert corresponds to the pitch of the thread of the fastener. In addition, the insert comprises a substantially rectangular section. The height of the insert is substantially equal to the height of the upper portion of the helical tapping. The insert also comprises an interior end nearest to the screwing axis and an exterior end furthest from the screwing axis. The section of the insert is positioned in the upper portion of the helical tapping so that the interior end is positioned at a distance from a longitudinal axis of the fastener substantially equal to the radius of the shank of the fastener. The exterior end of the insert is positioned at a distance from the screwing axis intermediate between the interior end of the lower portion of the helical tapping and the exterior end of the upper portion of the helical tapping thereby producing radial play between the insert and the exterior end of the upper portion of the tapping. In another embodiment, the invention comprises the above-described device in combination with the support.

The device further comprises a tie plate having an upper surface and a substantially planar lower surface adapted to rest flatly on the upper surface of the support. The tie plate comprises at least one hole extending through the tie plate and having a radius at least as great as the maximum radius of the thread of the fastener so as to comprise means for receiving the fastener.

The head of the fastener comprises an annular shoulder extending around the longitudinal axis of the shank. This annular shoulder is adapted to press on the flange of the rail.

The lower surface of the tie plate further comprises at least one annular zone surrounding the at least one hole of the tie plate on all sides thereof. The upper surface of the support comprises at least one annular zone surrounding the borehole of the support on all sides thereof. The circular periphery of the annular zone of the hole of the support comprises the helical tapping.

One of the sloped sides of the thread of the fastener preferably comprises means for compressing the timber of the support between the helical metal insert and the annular zone of the lower surface of the tie plate substantially parallel to the screwing axis. The predetermined screwing axis is secant with and substantially perpendicular to the upper surface of the support. In addition, the shank is preferably cylindrical in shape and is defined by a cylinder of revolution defined by a predetermined radius and a longitudinal axis of symmetry coincident with the screwing axis. The sloped sides of the thread of the fastener preferably form a constant angle with the longitudinal axis of the shank and have a constant pitch. In addition, the shape and dimensions of a cross-section of the section of said thread of said tapping taken along a plane passing through the screwing axis at one point therealong is the same for all cross-sections taken along all planes passing through the screwing axis at one point therealong. In addition, the shape and dimensions of a cross-section of the section of said thread of said fastener taken along a plane passing through the screwing axis at one point therealong is the same for all cross-sections taken along all planes passing through the screwing axis at all points therealong.

The angle and pitch of the sloped sides of the fastener are substantially equal to the angle and pitch of the thread of the helical tapping of the support, respectively. The pitch of the insert is preferably substantially equal to the pitch of the thread of the fastener.

In still another embodiment, the invention comprises the above-described fastening device in combination with the support. In this embodiment, the upper portion of the helical tapping is defined by an upper generatrix, a lower generatrix, and a base generatrix. The upper and lower generatrices are substantially rectilinear and substantially perpendicular to the screwing axis and are spaced apart by a predetermined height. The base generatrix is substantially rectilinear and substantially parallel to the screwing axis and is spaced from the screwing axis by a distance greater than the maximum radius of the thread of the fastener and by a distance substantially equal to the radius of a circular periphery of the annular zone of the lower surface of the tie plate.

The lower portion of the helical tapping is contiguous with the upper portion and is defined by a base generatrix and a lower generatrix. The base generatrix of the lower portion is substantially rectilinear and substantially parallel to the screwing axis and is spaced from the screwing axis by a distance intermediate between the maximum radius of the thread of the fastener and the distance separating the screwing axis from the base generatrix of the upper portion. The lower generatrix of the lower portion of the tapping has a configuration permitting positioning of the section of the thread of the fastener in the lower portion of the helical tapping.

The section of the metal insert is defined by an upper generatrix, a lower generatrix, an interior radial generatrix, and an exterior radial generatrix. The upper and lower generatrices are substantially rectilinear and perpendicular to the screwing axis and are spaced apart by a distance substantially equal to the distance separating the upper and lower generatrices defining the upper portion of the helical tapping. The interior radial generatrix is substantially rectilinear and substantially parallel to the screwing axis and is spaced from the screwing axis at a distance substantially equal to the radius of the shank of the fastener. This exterior radial generatrix is substantially rectilinear and substantially parallel to the screwing axis and is spaced from the screwing axis by a distance intermediate between the base generatrix of the lower portion of the section of the thread of the tapping and the base generatrix of the upper portion of the section of the thread of the tapping. The insert is positioned in the upper portion of the section of the thread of the tapping so as to produce radial play of the helical metal insert with respect to the base generatrix of the upper portion of the section of the thread of the tapping. This radial play is preferably equal to 0.5 mm. Additionally, the ratio of the pitch of the metal insert and twice the radius of the periphery of the borehole is preferably at most equal to 0.55. Also, the ratio of the height of the metal insert to the pitch of the insert is preferably approximately equal to 0.25.

In still another embodiment, the invention relates to a method for forming a device for attaching a rail on an upper, substantially planar surface of a timber support. The method comprises the step of forming a borehole in an upper surface of the support. The borehole so formed has an inner radius corresponding substantially to the radius of a shank of a fastener adapted to be screwed into the borehole along a screwing axis. The borehole comprises a periphery. The method further comprises the step of forming a helical tapping in the periphery of the borehole. The helical tapping so formed comprises a thread having a pitch corresponding to the pitch of the thread of the fastener. The method further comprises the step of providing the helical tapping with a section comprising a substantially rectangular upper portion and a lower portion contiguous with the upper portion. The upper portion has an exterior end spaced from the screwing axis a distance greater than the maximum radius of the thread of the fastener and the lower portion comprises a portion substantially rectilinear and substantially parallel to the screwing axis at a distance therefrom intermediate between the thread of the fastener and the exterior end of upper portion. The lower portion further comprises another portion configured to permit the placement of the thread of the fastener in the another portion of the lower portion of the thread of the helical tapping.

The method further comprises a step of screwing an elastic helical metal insert into the helical tapping. The insert comprises a flat metal strip having a substantially rectangular cross-section and a pitch corresponding to the pitch of the thread of the fastener. The method further comprises the step of positioning the insert in the upper portion of the section of the helical tapping. The height of the insert is substantially equal to the height of the upper portion of the section of the helical tapping. The insert comprises an interior end and an exterior end.

This method further comprises the steps of positioning the interior end of the insert at a distance from the screwing axis corresponding substantially to the radius of the shank of the fastener, and positioning the exterior end of the insert at a distance intermediate between the rectilinear portion of the lower portion of the thread of the tapping and the exterior end of the upper portion of the thread so as to produce radial play between the exterior end of the insert and the exterior end of the upper portion of the tapping.

The method further comprises the step of screwing the fastener into the borehole along a predetermined screwing axis. This predetermined screwing axis is secant with and substantially perpendicular to the upper surface of the support. The method further comprises the step of providing the fastener with a cylindrical shaft extending around the screwing axis and having a predetermined radius, and providing the fastener with a helical thread comprising a section having a constant pitch. The method further comprises the step of providing the section with two sloped sides sloped with respect to the screwing axis of the shaft and having the maximum radius with respect to the screwing axis. The method further comprises the step of screwing the helical thread of the fastener into the helical tapping of the borehole.

The method further comprises providing the fastener with a head having an annular shoulder revolution around its screwing axis. The method further comprises a step of pressing the head on the bottom of the flange of the rail. The method further comprises the steps of forming a hole in the tie plate; passing the fastener through the at least one hole in the tie plate before screwing the fastener in the borehole; and resting the lower, substantially planar surface of the tie plate on the upper surface of the support. This method further comprises a step of pressing the head of the fastener on the upper surface of the flange of the rail thereby pressing the flange against the upper surface of the tie plate. The method further comprises the step of producing an annular zone on the lower surface of the tie plate surrounding at least one hole on all sides thereof.

The step of forming a cylindrical borehole in the upper surface of the support comprises the steps of: forming a cylindrical borehole defined by a cylinder revolution around the screwing axis having an inner radius corresponding substantially to the radius of shank of the fastener; and forming an annular zone in the upper surface of the support surrounding the cylindrical borehole on all sides thereof. The step of forming the helical tapping in the periphery of the borehole comprises the step of forming a helical tapping in the circular periphery having a constant pitch, wherein the shape and dimensions of a cross-section of the section of the thread of said tapping taken along a plane passing through the screwing axis at one point therealong is the same for all cross-sections taken along all planes passing through from the screwing axis at all points therealong.

The step of forming the helical tapping further comprises the steps of defining the upper portion of the tapping by an upper, a lower, and a base generatrix. The upper and lower generatrices are substantially rectilinear and substantially perpendicular to the screwing axis and are spaced apart by a predetermined height. The base generatrix is substantially rectilinear and substantially parallel to the screwing axis and is spaced from the screwing axis by a distance greater than the maximum radius of the thread of the fastener and is spaced from the screwing axis by a distance substantially equal to the radius of the annular zone of the lower surface of the tie plate. The step of forming the helical tapping further comprises the step of defining the lower portion by a base and a lower generatrix. The base generatrix is substantially rectilinear and substantially parallel to the screwing axis and is spaced from the screwing axis by a distance intermediate between the maximum radius of the thread of the fastener and the distance separating the base generatrix of the upper portion from the screwing axis. The lower generatrix has a configuration permitting the section of the thread of the fastener to be placed in the lower portion of the section of the thread of the tapping.

The method further comprises the step of providing the insert with a section having a constant pitch forming the section so that the shape and dimensions of a cross-section of the insert taken along a plane passing through the screwing axis at one point therealong is the same for all cross-sections along all planes passing through the insert and the screwing axis taken at all points along the screwing axis. The method further comprises the step of defining the section of the insert by substantially rectilinear upper, lower, interior radial, and exterior radial generatrices. The upper and lower generatrices are substantially perpendicular to the screwing axis and are separated by a distance substantially equal to the distance separating the upper and lower generatrices of the helical tapping. The interior radial generatrix is substantially parallel to the screwing axis and is spaced from the screwing axis by a distance substantially equal to the radius of the shank of the fastener. The exterior radial generatrix is substantially parallel to the screwing axis and is spaced from the screwing axis by a distance intermediate to the base generatrix of the lower portion of the section of the thread of the tapping and the base generatrix of the upper portion of the section of the thread of the tapping.

The method further comprises the step of placing the insert into a stressed condition from an unstressed condition. In the stressed condition the insert is in an elastically expanded position after screwing the insert into the helical tapping. In the stressed condition the helical metal insert is elastically expanded to an extent of less then or at most equal to the radial play. The method further comprises returning the metal insert to the unstressed condition before screwing in the fastener. The method further comprises the step of producing a radial play which is at most equal to 0.5 mm. The method further comprises the step of forming the insert and the borehole such that the ratio of the pitch of the metal insert to twice the radius of the periphery of the borehole is at most equal to 0.55, and the ratio of the height of the helical metal insert to the pitch of the insert is approximately equal to 0.25.

BRIEF DESCRIPTION OF THE DRAWINGS

Other objects, characteristics and advantages of the invention will be better understood by reading of the detailed description which follows and with reference to the attached drawings in which:

FIG. 7 shows diagramatically the use of the mandrel of FIG. 6 for positioning a metallic insert during the casting or moulding of a support of cast or moulded material.

Figure 1:
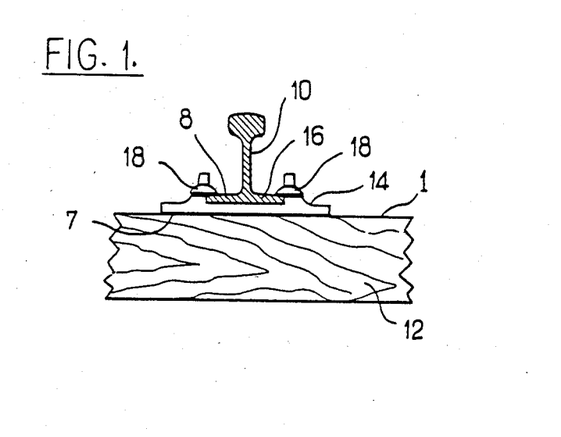
FIG. 1 is an elevation view of a timber support on which is fastened a rail by means of a tie plate and two screwed-in fasteners of the coach screw type.

FIG. 1 shows a rail 10 fixed on a timber support 12, of the tie type, by means of a tie plate 14 interposed between the foot 16 of the rail 10 and the support 12. The rail 10 is held down on the support 12 by means of two fasteners 18, of the coach-screw type, placed on each side of the rail foot 16 and passing through respective holes in the plate 14.

Figure 2:
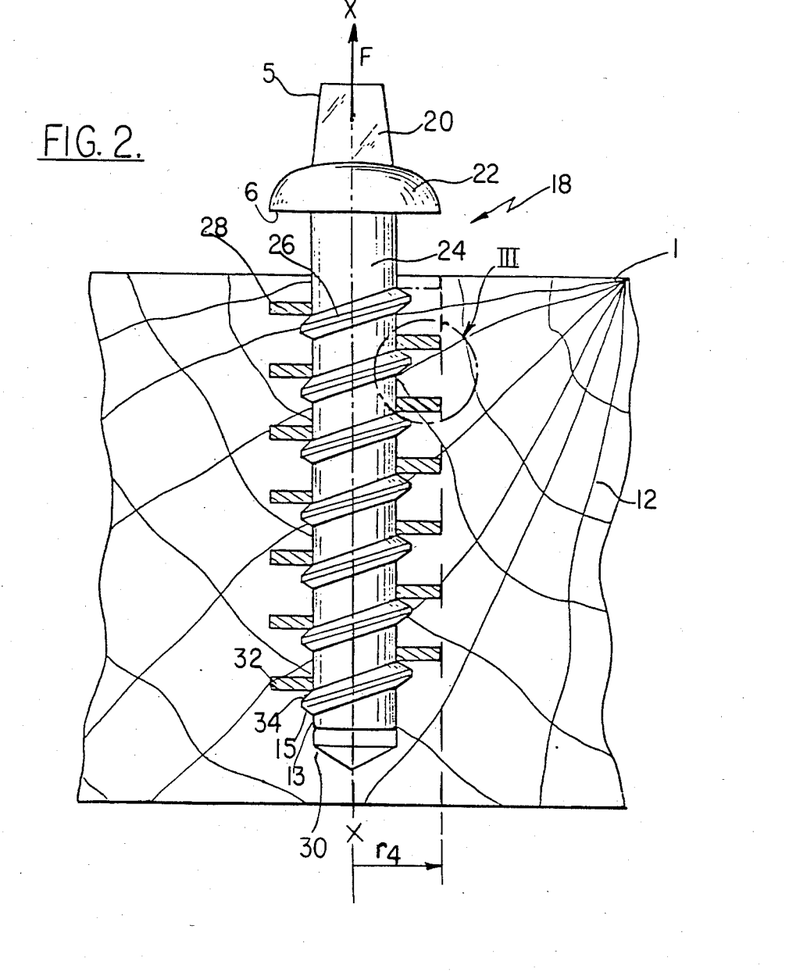
FIG. 2. is a sectional view of FIG. 1, taken in a plane passing through the axis of one of the fasteners, and showing the structure of the helical insert of the invention.

The fasteners 18 are formed by conventional coach-screws such as that represented in FIG. 2. These fasteners each comprise a driving head 20 of square cross-section which is extended by a collar 22 which is itself connected to the core 24 of the fastener. The core 24 is a cylindrical core provided with a helical thread 26 of constant pitch and section. By way of example, the fastener 18 may be formed by a conventional coach screw having a total length of 135 mm, a core diameter of 23 mm, a screw-threaded length of 90 mm and a pitch of 12.5 mm.

Figure 3:
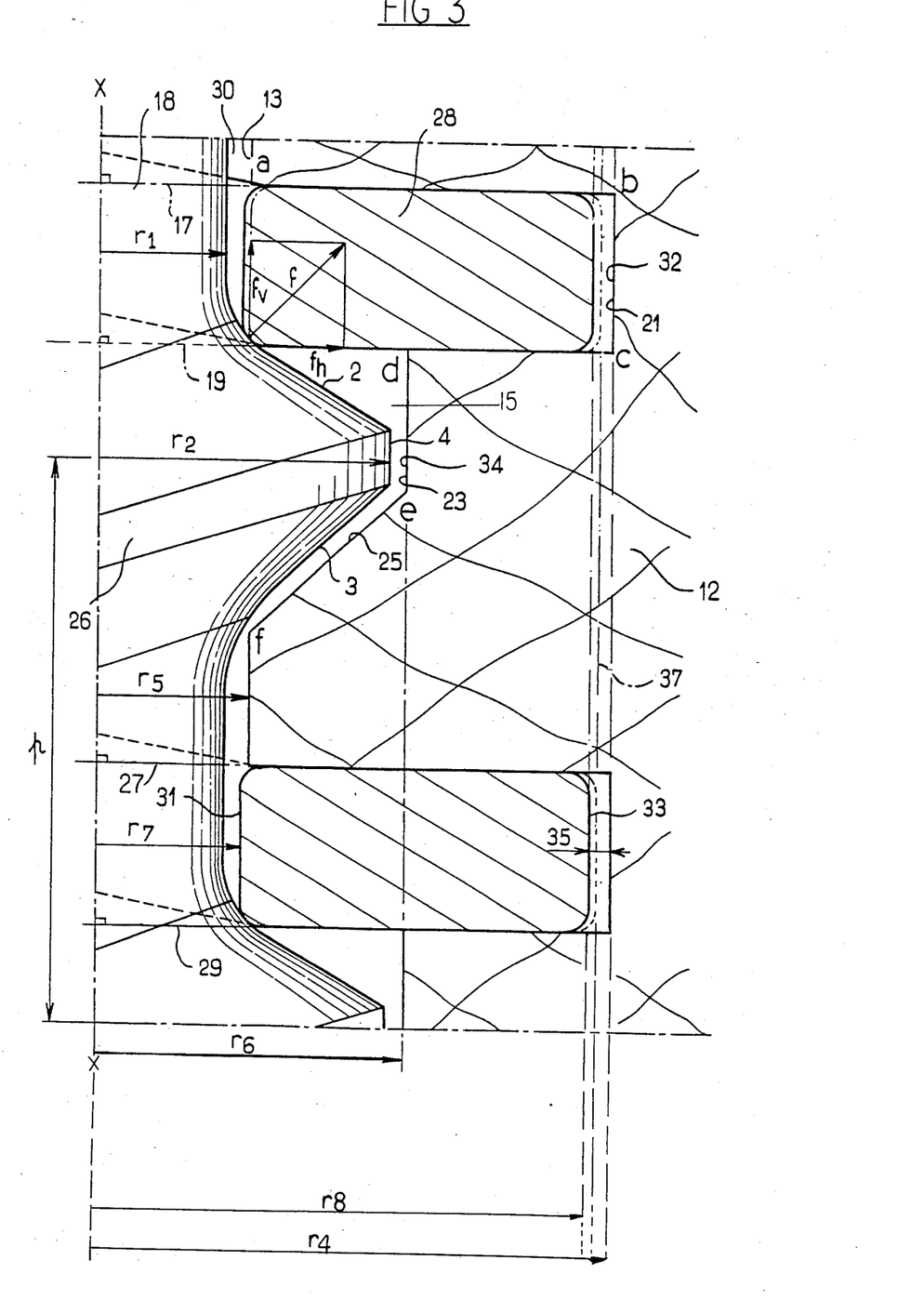
FIG. 3 shows a portion of FIG. 2 on an enlarged scale.

Each fastener 18 is screwed in support 12 along a predetermined screwing axis X-X that passes through and is substantially perpendicular to upper surface 1 of support 12. Fasteners 18 each comprise a cylindrical shank 24. Each shank 24 is defined by a cylinder of revolution around a longitudinal axis aligned with axis X-X having a radius $r_1$ and is furnished with a helical thread 26. Thread 26 has a constant pitch p and comprises as is illustrated in FIG. 3, a trapezoidal section through any plane parallel to axis X-X. The trapezoidal section is defined by an upper side 2 and a lower side 3 sloped to form acute angles with the longitudinal axis 24. Sloped sides 2 and 3 form a constant acute angle with axis X-X and the shape and dimensions of a cross-section of the trapezoidal section taken along a plane passing through screwing axis X-X at one point therealong is the same for all cross-sections taken along all planes passing through axis X-X at all points there along. Upperside 2 and lower side 3 are connected therebetween by a surface or summit 4 located along a cylinder of virtual revolution about the axis of shank 24. The cylinder of virtual revolution has a radius $r_2$ greater than $r_1$ defining the maximum radius of thread 26. The top portion of thread 26 and shank 24 is attached integrally to a tightening head 20 having an upper portion 5 of square cross-section and a lower portion in the form of collar 22 defining, around the shank, an annular shoulder 6 of revolution about the longitudinal axis of shank 24. Shank 24 passes through the bottom of flange 16 of rail 10 either directly, as is illustrated, or by means of a clip that is not shown. By way of example, fastener 18 can be a conventional coach-screw having a total length of 135 mm, having a diameter of the shank of 23 mm, having a length of the threaded portion of 99 mm, and having a pitch of 12.5 mm.

Tie plate 14 has a substantially planar lower surface 7 that is adapted to rest flatly on upper surface 1 of support 12 as illustrated in FIG. 1. As shown in FIG. 2, upper surface 8 of tie plate 14 supports flange 16 of rail 10. Tie plate 14 has a hole 9 passing therethrough permitting the passage of the threaded shank of each fastener 18. This hole has a radius $r_3$ corresponding substantially to the maximum radius $r_2$ of thread 26. It should be noted that each of holes 9 is located such that lower surface 7 of tie plate 14 comprises at least one annular zone 11 surrounding hole 9 on all sides thereof and defining, in the radical direction with respect to the longitudinal axis of hole 9, a circular periphery area centered on this longitudinal axis and having a predetermined radius $r_4$ greater than the maximum radius $r_2$ of thread 26 of fastener 18.

To improve the grip of the fastener 18 in the support 12, a fixing device in accordance with the invention formed by a helical metal insert 28 is introduced into this support. This insert is formed from a flat strip, of rectangular cross-section which is wound to form a coil having, in its unstressed configuration, an internal diameter equal to the diameter of the core of the fastener and a pitch equal to that of the fastener. Thus, in the example mentioned above, this coil has a diameter of 23 mm and a pitch of 12.5 mm.

Helical metal insert 28, is introduced into the support as shown in FIGS. 2 and 3. To accommodate insert 28, support 12 is bored with a borehole 30 located in its upper surface 1. Hole 30 is cylindrical in shape and is therefore described by a cylindrical periphery of revolution 13 extending symmetrically around screwing axis X-X having an inner radius $r_5$ corresponding substantially to the radius $r_1$ of shank 24 of fastener 18. Upper surface 1 of support 12 comprises at least one annular zone 15 surrounding hole 30 on all sides and is defined in the radial direction with respect to screwing axis X-X by a circular periphery centered on screwing axis X-X and having a radius equal to $r_4$ of the circular periphery of lower surface 7 of tie plate 14. To prevent mutual contact and to prevent radial compression between shank 24 of fastener 18 and periphery 13 of hole 30, regardless of the allowable tolerances provided by radius $r_1$, the radius of periphery 13, radius $r_5$ is chosen to be greater than the maximum value or $r_1$.

Cylindrical periphery 13 of hole 30 is drilled so that it comprises a helical tapping having a thread 15 whose pitch is constant. Thread 15 comprises a section such that the shape and dimensions of a cross-section taken along a plane passing through screwing axis X-X at one point therealong is the same for all cross-sections taken along all planes passing through the screwing axis at all points therealong. The pitch of thead 15 of the helical tapping corresponds substantially to the pitch p of thread 26 of fastener 18. The section of thread 15 of the helical tapping has an upper portion 32 that is substantially rectangular and is defined by three generatrices: an upper generatrix 17 and a lower generatrix 19, which are substantially rectilinear and perpendicular to screwing axis X—X and spaced apart by a predetermined height b-c, and a base generatrix 21 substantially rectilinear and parallel to screwing axis X—X. Generatrix 21 is spaced a distance from axis X—X greater than the maximum radius $r_2$ of thread 26 of fastener 18 and corresponding substantially to the radius of the circular periphery of annular zone 15 of the lower surface 7 of tie plate 14. As a result, the distance of generatrix 21 from axis X—X is designated by the same reference $r_4$ as the radius of the circular periphery of annular zone 15.

The section of thread 15 of the helical tapping also has a lower portion 34 that is contiguous with upper portion 32. Lower portion 34 is defined by a base generatrix 23 and a lower generatrix 25. Base generatrix 23 is substantially rectilinear and parallel to screwing axis X—X at a distance $r_6$ therefrom that is intermediate between maximum radius $r_2$ of thread 26 of fastener 18 and distance $r_4$ separating the base generatrix 21 of upper portion 32 from screwing axis X—X. Lower generatrix 25 has a configuration allowing for the engagement of thread 26 of fastener 18 in lower portion 34 of the thread section of helical tapping 15 without contact of thread 26 of fastener 18 with timber support 12. Generatrix 25 is, for example, rectilinear, having a slope identical to that of lower side 3 of thread 26 of fastener 18 with respect to axis X—X.

Helical metal insert 28 is screwed into helical tapping 15 by means of a mandrel 46. Metal insert 28 comprises a flat metal strip having a substantially rectangular cross-section. The strip is helically rolled and is flexible. Helical metal insert 28 is adapted to be placed in an unstressed condition and a stressed condition. In its unstressed condition insert 28 occupies a rest position in which the pitch of insert 28 is constant and substantially corresponds to pitch p of thread 26 of fastener 18. In addition, the insert comprises a section that in the rest position, has a cross-section of shape and dimensions taken along any plane passing through the screwing axis that is the same for all cross-sections taken at different points along screwing axis X—X.

This section of helical metal insert 28 is substantially rectangular and is defined by four generatrices: an upper generatrix 27, a lower generatrix 29, an interior radial generatrix 31, and an exterior radial generatrix 33. Upper and lower generatrices 27 and 29 are substantially rectilinear and substantially perpendicular to an axis aligned with screwing axis X—X and are separated by a distance that is substantially equal to the height b-c separating upper and lower generatrices 17 and 19 of upper portion 32 of section 25 of helical tapping 15. Generatrix 31 is substantially rectilinear and substantially parallel to an axis aligned with screwing axis X—X (or axis X—X itself) and is spaced a distance $r_7$ therefrom. Distance $r_7$ corresponds substantially to radius $r_1$ of shank 24 of fastener 18. In addition, $R_7$ can be greater than $r_1$. Generatrix 33 is substantially rectilinear and substantially parallel to an axis aligned with screwing axis X—X (or axis X—X itself). Generatrix 33 is spaced a distance $r_8$ from axis X—X. Distance $r_8$ is intermediate between distances $r_6$ and $r_4$. $R_6$ is the distance separating base generatrix 23 of lower portion 34 of the section of the thread of tapping 15 from axis X—X, and $R_4$ is the distance separating base generatrix 21 of upperportion 32 of the section of the thread of tapping 15 from screwing axis X—X. The section of helical metal insert 28 is positioned in upper portion 32 of the section of the thread of tapping 15 so as to allow for radial play 35, which is preferably at most equal to 0.5 mm with respect to base generatrix 21. Thus, in the example mentioned above, helical metal insert 28 has an approximate inner diameter of 23 mm and a pitch of 12.5 mm.

As is apparent in FIG. 2, metal insert 28 is wound in such a manner that any plane passing through axis X—X of the coil cuts the flat strip perpendicularly to its initial length. The insert has, perpendicular to axis X—X, its greatest length defined by dimension $r_8$–$r_7$ parallel to axis X—X, with its smallest width or height defined by height b-c. Insert 28 consequently may be formed by helically winding a metal strip around a cylinder having a diameter equal to that of shank 24, i.e., 23 mm in the previously-mentioned example. The length of metal insert 28 normally will be equal to that of the screw-threaded portion of fastener 18, i.e., 90 mm in the case of the above-mentioned example. Nevertheless, the use of helical inserts of greater length is within the scope of the invention. The thickness or height of the metal strip forming insert 28 preferably is such that the ratio between the height or thickness of the insert and the pitch of the insert is approximately equal to 0.25. Thus, in the example mentioned above where the pitch is 12.5 mm, a mild steel strip having a height or thickness of about 3 mm can be used. The width of this strip may be, for example, about 7 mm.

It should be noted that in referring to insert 28 as a whole, the "length" of insert 28 refers to the vertical dimension of insert 28 as seen in FIG. 2. However, when referring to the section of the insert defined by generatrices 27, 29, 31, 33, the length of this section refers to the horizontal dimension of this section seen in FIG. 3.

The value of the ratio indicated above enables both the required mechanical strength of the metal insert to be ensured and the maintenance between the turns of the insert 28 of a sufficient thickness of timber fiber or of cast or moulded material as the case may be.

The fastening method of the invention, which calls for the insert just described, consists in drilling in the support 12 a cylindrical hole 30 on the axis XX at the location for the fastener, this cylindrical hole having a diameter corresponding to that of the core 24 of the fastener 18 (cf. FIG. 3). Simultaneously with or after the formation of the drilling of the cylindrical hole 30, a helical thread 32 is tapped into the periphery of the cylindrical hole 30, this helical tapping having dimensions corresponding to those of the helical insert 28. Thus, the thread of the tapping 30 presents a rectangular section of which the height bc is equal to the thickness of the metal strip forming the insert 28 and of which the depth ab is equal to the width of the metal strip increased by a tolerance at more equal to 0.5 mm. This tolerance is necessary in order that the insert may be installed in a radially expanded condition, in order that the insert does not project into the interior of the cylindrical hole 30, in order that limited shrinkage of the timber remains possible without compressing the insert at right angles to its axis and in order to permit furthermore the diameter of the circumscribing cylinder of the insert to increase under the action of forces perpendicular to the axis XX exerted by the screw threads of the fastener 18 on the insert 28. The rectangular section of the thread of the tapping 32 is extended at its lower corner adjacent the axis XX of the hole by a chamfer 34 of profile d-e-f (cf. FIG. 3) the dimensions of which exactly permit the passage of the screw thread 26 of the fastener 18 without the latter having any action on the timber. The formation of the chamfer 34 is preferably effected at the same time as that of the tapping 32. To permit a good grip of the fastener 18 in the insert 28, the ratio between the pitch of the insert 28 and the diameter of the cylindrical hole 30 should know a maximum of 0.55.

PREFERRED METHOD OF CARRYING OUT THE INVENTION

Figures 4, 5, 6:
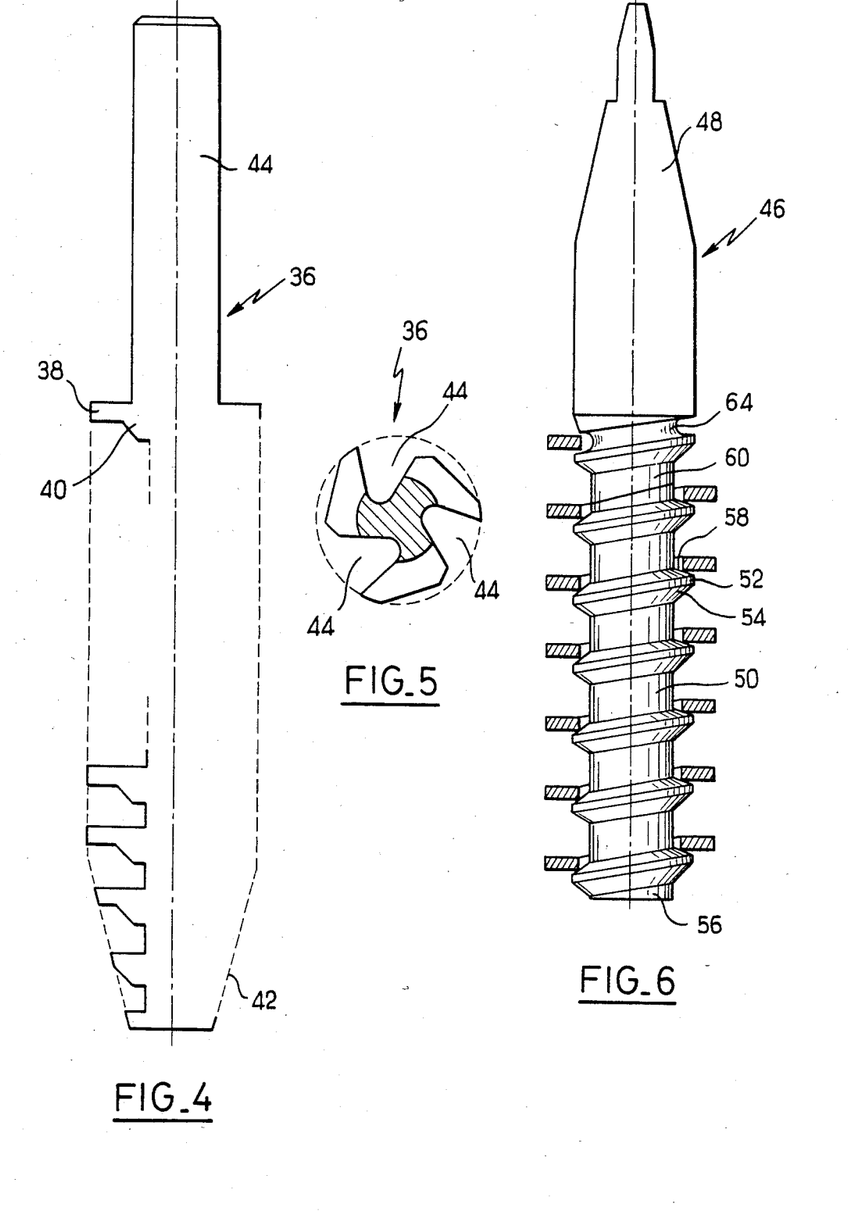
FIG. 4 is a diagrammatic elevation view of a tapping device used for carrying out the method of the invention in the case of a timber support.
FIG. 5 is a cross-sectional view of the device of FIG. 4.
FIG. 6 is an elevation view of the mandrel used for carrying out the method of the invention.

In accordance with the preferred method of carrying out the invention, the cylindrical hole 30 is first drilled by means of a conventional drilling device of the borer type or the like, and then the helical threading is formed simultaneously with the chamfer by means of the tapping device 36 shown in FIGS. 4 & 5. This tapping device comprises a helical thread 38 of rectangular section extended by a chamfer 40, the thread 38 and chamfer being intended to form in the timber of the support the previously mentioned threading 32 and chamfer 34. The pitch of the thread 38 and of the chamfer 40 is equal to the pitch of the insert 28 and to the pitch of the thread of the fastener 18. The device 36 has a conical head 42 and a shank 44 intended to be driven in rotation by any appropriate means.

As can be seen in FIG. 5 the device 36 has three flutes 44 extending parallel to the axis of the device and spaced at intervals of 120°. The flutes 44 are intended to permit the ejection towards the outside of the wood cuttings produced by the device 36 during the tapping operation.

Once the aforementioned hole and threading have been completed, the helical insert 28 is installed in the helical thread 32 which has been formed in the support. This installation is effected by means of the mandrel 46 shown in FIG. 6. This mandrel comprises a driving shank 48 and a screw threaded portion 50 which has the same pitch and the same profile as the screw threaded portion of the fastener 18. The screw thread 52 of the portion 50 comprises a sloping surface 54 directed towards the head 56 of the mandrel and a sloping surface 58 directed towards the shank 48 of the mandrel.

The radial expansion of the insert 28 around the mandrel takes place as a result of a holding thread 60 which starts at a point 62 to end in a point 64 situated at level of the connection between the screw threaded portion 50 and the shank 48. The points 62 and 64 are spaced from each other by an axial distance corresponding substantially to the pitch of the thread 52. When the mandrel is inserted by screwing into the insert 28, the latter comes into contact with the sloping surface 58 of the screw thread 52. At the end of the screwing on operation, the holding thread 60 causes the radial expansion of the insert 28 under the joint action of the sloping surface 52.

The mandrel 46 maintaining the insert 28 in its radially expanded position is screwed into the bore and the helical threading formed in the timber support. The insert 28 thus comes to occupy the helical thread 32 of which the excess depth created by the previously mentioned tolerance permits the insertion of the insert it its radially expanded condition, while the thread 52 of the mandrel 46 comes to occupy the space of the chamfer 34 formed in the timber.

After insertion of the insert into the support, the mandrel 46 is removed by unscrewing it. The insert remains in place in the support and returns to its unstressed condition. The rail may then be fastened down on the support by means of a fastener 18, the latter causing once again the radial expansion of the insert.

When the rail is to be affixed to timber support 12, tie plate 14 is placed on support 12, and the lower surface 7 of tie plate 14 is placed flatly against upper surface 1 of support 12. Flange 16 of rail 10 is then placed on upper surface 8 of tie plate 14. Next, the bottom end of shank 24 of fastener 18 engages hole 9 of tie plate 14, and fastener 18 is screwed into borehole 30 of support 12 by engaging thread 26 of fastener 18 immediately below helical metal insert 28 in the lower portion 34 of the section of the thread of helical tapping 15. Fastener 18 is screwed down until the bottom of shoulder 6 of the head of fastener 18 rests on flange 16 of rail 10 that itself rests on tie plate 14, and until upper side 2 of thread 26 of fastener 18 rests on helical metal insert 28 at the junction of generatrices 29 and 31. The other portion of insert 28 rests on the wood of timber support 12 at upper generatrix 27 and generatrix 17 of the insert. This position is illustrated by a dashed line in FIG. 3 where insert 28 again occupies its rest position.

The screwing of fastener 18 continues in a limited fashion such that the pressing of upper surface 2 of thread 26 of fastener 18 at junction 29, 31 of helical metal insert 28 causes an elastic radial expansion of insert 28 because side 2 of the thread of fastener 18 is sloped with respect to screwing axis X—X. The amplitude of this elastic radial expansion of insert 28 is at most equal, and preferably less than, radial play 35, thus compressing the wood of timber support 12 between helical metal insert 28 and the annular zone of the lower surface of the tie plate parallel to the screwing axis without applying radial forces to the wood of the support.

It should be noted that helical insert 28 does not exert on support 12 any force of the kind to encourage the formation of splits in the wood. As a result of the minimum initial play 35 between insert 28 and generatrix 21 of tapping 15, (as illustrated in FIG. 3 by the dashed lines of insert 28 in its final expanded state after screwing-in of fastener 18 in tapping 15) when a train passes over rail 10, the traction F that is generated (due to the tendency of the rail to give) upwardly along axis X-X on fastener 18 generates, in turn, a force f on upper side 2 of fastener 18 against insert 28 that is oblique with respect to axis X-X. Force f is a constraint force and is oblique because the portion of side 2 that contacts insert 28 is oblique with respect to axis X-X. Constraint force f is composed of a component $f_v$ parallel to axis X-X and by component $f_h$ perpendicular thereto. It should be noted that component $f_v$ causes fastener 18 to be displaced upwardly parallel to axis X-X thereby pressing insert 28 against upper generatrix 27 and upper generatrix 17 of the tapping 15. In addition, force $f_h$ causes a supplementary radial expansion of insert 28. A suitable choice of dimensional characteristics and the stiffness of insert 28 prevents insert 28 from contacting generatrix 21 of the helical tapping 15 during expansion and also prevents the transmittal of a radial force to the timber of support 12.

Thus, only a zone of a virtual cylinder 37 around axis X-X having an intermediate radius between $r_8$ and $r_4$ is stressed. Furthermore, this zone is compressed exclusively between insert 28 and lower surface 7 of tie plate 14 that is loaded from top to bottom because of the mass of the train passing over the rails.

The assembly of screw-in fastener 18 and helical insert 28 comprises a metal-to-metal contact permitting repeated screwing (laying) or unscrewing (lifting) without mechanical modification or destruction of the fibers of timber support 12. Further, the absence of vertical play between the turns of helical insert 28 and timber support 12 ensures that insert 28 acts over its entire length in resisting the forces exerted on it. It should also be noted that the torque exerted during screwing-in of the fastener causes a slight increase in the apparent diameter of the insert (between 0.05 and 0.01 mm in accordance wth the value dictated by the torque). This results in a force on the fastener that increases the vertical elasticity of the assembly of insert 28 and the timber fibers and contributes to the conservation of the energy established during the screwing-in of the fastener thus ensuring a positive lasting action of the fastener on the flange of the rail and imparting an "anti-creep" function to the assembly. It also should be noted that the screwing-in of fastener 18 into insert 28 can be carried out without special precautions in relation to the torque exerted. The volume of fiber affected by the forces exerted by the fastener is much greater than would be the case for the same fastener without the insert. The component perpendicular to the longitudinal axis of the bore of these forces is carried by the insert without transmission to the timber. Thus, for screwing the attachment in, a motor-driven screwing-in device can be used having an automatic overload clutch that disengages when the maximum possible torque is attained. Static extraction tests carried out with an extraction test rig have confirmed results superior to those obtained on the same qualities of wood support by conventional attachments screwed into timber.

These same tests have shown, furthermore, that the static force required to begin the extraction of a fastener such as a coach-screw is substantially proportional to the length over which the thread of the cylindrical portion of the fastener is engaged in the turns of insert 28. These tests also have shown that after the start of extraction in which the threads of the fastener jump over the turns of the insert against which they are bearing, by the combination of resilient deformation with a partial permanent deformation of these turns, and after removal of the fastener by unscrewing, the latter may be reused in the same bore while conserving 80-90% of its original integrity and efficacy.

The actual structure of insert 28 and the characteristics of the cavity that receives it are such that the forces transmitted by insert 28 to the fibers of timber support 12 are absolutely incapable of destroying the support. Further, any tendency to actually split the timber of support 12, which could in the absence of insert 28 result in a split passing through one of the drilled holes, would be restrained by the opposing action of the turns of the insert, the diameter of which cannot increase.

Reference will now be made to FIG. 7 to describe the carrying into effect of the method of the invention in the case of a support of moulded or cast material for example of reconstituted wood or of reinforced concrete, The mandrel 46 (previously described with reference to FIG. 6) holding the insert 28 in its radially expanded configuration is fixed to the mould 66 for forming the support. This fixing may be effected by any appropriate means providing a precise position of the insert 28 at the location intended for fixing the fastener. The material to form the support is then poured into the mould and, after drying or setting of this material, the mandrel 46 is withdrawn by un-screwing it while leaving the insert in place in the support.

The removal of the mandrel causes the return of the insert to its unstressed configuration. It will be noted that the thread 52 of the mandrel enables the formation during moulding or casting of a chamfer similar to the chamfer 34 formed in the timber (cf. FIG. 3) for the later insertion of the screw thread of the fastener.

As a result, during screwing of the fastener into the insert, the thread of the fastener takes up the space provided by the previously mentioned chamfer and the co-operation of the screwed-in fastener/insert takes place solely by metal/metal contact as in the case of the fixing to a timber support.

The method of the invention may be applied to timber supports, new or used, in track or in workshop or to new supports of cast or moulded material.

Although the invention has been described with respect to particular means, embodiments, and materials it is understood that the invention is not limited to the particulars disclosed and extends to all equivalents within the scope of the claims.

We claim:

1. A method for attaching a rail on an upper, substantially planar surface of a timber support by means of at least one fastener and a tie plate, wherein said fastener is adapted to be screwed into said support along a predetermined screwing axis, said fastener comprising a shank having a predetermined radius and extending around a longitudinal axis coincident with said screwing axis wherein said shank comprises a helical thread having a section comprising two sides that are sloped with respect to said longitudinal axis of said shank, wherein said section has a predetermined maximum radius with respect to said longitudinal axis, said fastener further comprising a head, said head adapted to rest on the bottom of a flange of said rail, and wherein said tie plate comprises at least one hole, an upper surface, and a substantially planar lower surface adapted to rest flatly on said upper surface of said support, wherein said at least one hole passes through said tie plate from said lower surface to said upper surface, said method comprising the steps of:

(a) forming a borehole in said upper surface of said support about said screwing axis wherein said borehole has an inner radius substantially equal to said predetermined radius of said shank of said fastener, wherein said borehole further comprises a periphery;

(b) forming a helical tapping in said periphery of said borehole wherein said tapping comprising a thread comprising a section, wherein the pitch of said thread of said helical tapping substantially corresponds to said pitch of said thread of said fastener, and wherein said section of said tapping comprises an upper portion and a lower portion, wherein said upper portion is substantially rectangular and defined by first and second ends substantially parallel to said screwing axis, wherein said second end is furthest from said screwing axis, wherein said lower portion is contiguous with said upper portion and comprises a first portion and a second portion, wherein said first portion is substantially rectilinear and parallel to said screwing axis, wherein said first portion is spaced from said screwing axis by a distance intermediate between said maximum radius of said thread of said fastener and said second end of said upper portion of the tapping, and wherein said second portion of said lower portion has a configuration permitting the placement of said section of said thread of said fastener in said lower portion of said helical tapping;

(c) screwing an elastic helical metal insert in said helical tapping wherein said metal insert comprises a flat metal strip having a cross-section that is substantially rectangular, wherein said helical metal insert is adapted to be placed in a stressed and an unstressed, rest condition, wherein the pitch of said helical metal insert substantially corresponds to said pitch of said thread of said fastener, wherein said insert comprises a substantially rectangular section having a height substantially equal to the height of said upper portion of said helical tapping, and having a length greater than the distance between the periphery of said shank and said first portion of said lower portion of said tapping and having a length less than the distance between the periphery of said shank and said second end of said upper portion of said tapping, wherein said method further comprises the step of positioning said helical metal insert in said upper portion of said section of said thread of said helical tapping so that said insert is spaced in the radial direction from said second end of said upper portion of said thread of said tapping so as to produce radial play between said helical metal insert and said upper portion, and so that said insert contacts said sloped side of said fastener when said fastener is screwed in said borehole;

(d) positioning said lower surface of said tie plate flatly against said upper surface of said support so that said screwing axis passes through said hole in said tie plate;

(e) placing said flange of said rail on said upper surface of said tie plate;

(f) passing said shank of said fastener through said hole in said tie plate;

(g) screwing said fastener in said borehole of said support by engaging said thread of said fastener immediately below said helical metal insert in said lower portion of said thread of said helical tapping until said head of said fastener is pressing on said flange of said rail, said flange is pressing against said lower surface of said tie plate, said tie plate rests on said support, and said sloped portion of said fastener presses against said insert; and (h) continuing the screwing of said fastener in a limited manner, wherein said continued screwing of said fastener elastically radially expands said helical metal insert to an extent less than or at most equal to said radial play, and compresses said timber of said support between said helical metal insert and said lower surface of said tie plate in a direction parallel to said screwing axis without applying radial forces to said timber of said support.

2. The method defined by claim 1 wherein said method further comprises the step of screwing said fastener in said borehole along a screwing axis secant with and perpendicular to said upper surface of said support, wherein said shank is cylindrical in shape and is defined by a cylinder of revolution having a longitudinal axis and a predetermined radius wherein the angle that said sloped sides form with said longitudinal axis is constant, wherein the shape and dimensions of cross-section of said section of said thread of said fastener taken along a plane passing through the screwing axis at one point therealong is the same for all cross-sections taken along all planes passing through said screwing axis at all points therealong, wherein said thread of said fastener has a constant pitch, wherein said head comprises an annular shoulder extending symmetrically around said longitudinal axis of said shank, wherein the shape and dimensions of a cross-section of said section of said thread of said tapping taken along a plane passing through said screwing axis at one point therealong is the same for all cross-sections taken along all planes passing through said screwing axis at all points therealong, wherein said lower surface of said tie plate comprises at least one annular zone entirely surrounding said at least one hole, wherein step (b) further comprises the steps of:

(i) forming a thread in said tapping having a constant pitch, (ii) defining said upper portion of said helical tapping by an upper generatrix, a lower generatrix, and a base generatrix, wherein said upper and lower generatrices are both substantially rectilinear and substantially perpendicular to said screwing axis and are spaced apart by a predetermined height, wherein said base generatrix is substantially rectilinear and is substantially parallel to said screwing axis, and is spaced from said screwing axis by a distance greater than said maximum radius of said thread of said fastener and by a distance substantially equal to said radius of a circular periphery of said annular zone of said lower surface of said tie plate; and (iii) defining said lower portion of said helical tapping by a base generatrix and a lower generatrix, wherein said base generatrix of said lower portion is substantially rectilinear and is substantially parallel to said screwing axis and is spaced from said screwing axis by a distance intermediate between said maximum radius of said thread of said fastener and the distance separating said screwing axis from said base generatrix of said upper portion, wherein said lower generatrix of said lower portion of said tapping has a configuration permitting positioning of said section of said thread of said fastener in said lower portion of said helical tapping, wherein step (c) comprises the step of screwing said insert in said helical tapping wherein said insert is adapted to be placed in a rest position in which said insert has a constant pitch and wherein the shape and dimensions of cross-sections of said insert taken along planes passing through the screwing axis at different points along said screwing axis are the same, wherein said section of said metal insert is defined by an upper generatrix, a lower generatrix, an interior radial generatrix, and an exterior radial generatrix, wherein said upper and lower generatrices are substantially rectilinear and substantially perpendicular to said screwing axis and are spaced apart by a distance substantially equal to said distance separating said upper and lower generatrices defining said upper portion of said helical tapping, wherein said interior radial generatrix is substantially rectilinear and substantially parallel to said screwing axis and is spaced from said screwing axis at a distance substantially equal to said radius of said shank of said fastener, wherein said exterior radial generatrix is substantially rectilinear and is substantially parallel to said screwing axis and is spaced from said screwing axis at a distance between said the distance separating said screwing axis from said base generatrix of said lower portion of said section of said thread of said tapping and said base generatrix of said upper portion of said section of said thread of said tapping, wherein said radial play is formed between helical metal insert and said base generatrix of said upper portion of said section of said thread of said tapping when said helical metal insert is positioned in said upper position of said section of said thread of said tapping, wherein said passing step (f) further comprises the step of passing the top of said shank of said fastener through said hole in said tie plate, wherein step (h) further comprises the steps of:

pressing said sloped portion of said fastener against the bottom of said helical metal insert, thereby pressing said surface of said helical metal insert defined by said upper generatrix of said insert upwardly against said timber of said support; and compressing said timber of said support between said helical metal insert and said annular zone of said lower surface of said tie plate only in a direction parallel to said screwing axis in response to said elastic radial expansion of said insert.

3. The method defined by claim 2 further comprising the steps of:

screwing said helical metal insert into said helical tapping of said support;

placing said helical metal insert into a stressed condition from an unstressed, rest condition, wherein in said stressed condition said helical metal insert is elastically radially expanded to an extent less than or equal to said radial play; and returning said metal insert to said unstressed, rest condition before screwing in said fastener.

4. The method defined by claim 3 wherein said radial play is at most equal to 0.5 mm.

5. The method defined by claim 4 wherein the ratio between said pitch of said helical metal insert and twice said radius of said periphery of said borehole is at most equal to 0.55.

6. The method defined by claim 5 wherein the ratio between the height of said metal insert and said pitch of said metal insert is approximately equal to 0.25.

7. A device for attaching a rail on an upper, substantially planar surface of a timber support, wherein said rail comprises a flange, wherein said support comprises a borehole comprising a portion adapted to accommodate a shank of a fastener, wherein said borehole further comprises a helical tapping comprising a substantially rectangular upper portion and a lower portion, wherein said upper portion comprises along the length thereof an interior end and an exterior end wherein said exterior end is further from said shank in the radial direction than said interior end, and wherein said lower portion comprises an interior end and an exterior end along the length thereof, wherein said device comprises:

(a) at least one fastener adapted to be screwed into said support along a predetermined screwing axis, said fastener comprising a shank having a predetermined radius, a longitudinal axis of symmetry coincident with said screwing axis, and a helical thread, wherein said thread has a section comprising two sides sloped with respect to said longitudinal axis of said shank, wherein said section has a maximum radius with respect to said longitudinal axis, wherein said fastener further comprises a head adapted to be pressed against said flange of said rail, wherein said predetermined radius of said fastener is substantially equal to said radius of said borehole, wherein the pitch of said thread said fastener is substantially equal to the pitch of said helical tapping, wherein said helical thread of said fastener has a shape permitting placement of said helical thread in said lower portion of said helical tapping;

(b) a tie plate comprising an upper surface and a substantially planar lower surface adapted to rest flatly on said upper surface of said support, wherein said tie plate further comprises at least one hole passing through said tie plate having a radius sufficient so that said tie plate comprises means for receiving said fastener therethrough;

(c) an elastic helical metal insert comprising a flat metal strip having a substantially rectangular cross-section adapted to be screwed in said helical tapping, wherein the height of said insert is substantially equal to the height of said upper portion of said helical tapping, wherein the length of said insert is less than the distance from the periphery of said shank to said exterior end of said upper portion of said helical tapping, wherein said insert comprises an interior end portion and an exterior end portion, spaced further from said shank than said interior end wherein said insert is positioned in said upper portion so that said interior end portion of said insert contacts at least one of said sloped sides of said fastener, and said exterior end portion is spaced from said exterior end of said upper portion of said helical tapping to produce radial play between said insert and said exterior end of said upper portion of said helical tapping, wherein said flange of said rail is adapted to be placed on said upper surface of said tie plate, and wherein said shank of said fastener comprises means for engaging said hole of said tie plate and means for screwing in said borehole of said support, wherein said thread of said fastener comprises means for engaging said lower portion of said helical tapping below said insert, wherein said head of said fastener comprises means for pressing on the bottom of said flange of said rail, wherein said flange comprises means for resting on said tie plate wherein one of said sloped sides of said thread of said fastener comprises means for pressing said helical metal insert upwardly and radially, thereby pressing said insert upwardly substantially parallel to said screwing axis against said timber of said support, and thereby elastically radially expanding said insert and placing said insert into a stressed condition, whereby said timber of said support is compressed between said helical metal insert and said tie plate substantially parallel to said screwing axis without the application of radial forces to the timber of said support.

8. The device defined by claim 7 wherein said head of said fastener comprises an annular shoulder extending around said longitudinal axis of said shank adapted to press on said flange of said rail, wherein said lower surface of said tie plate further comprises at least one annular zone surrounding said at least one hole of said tie plate on all sides thereof, wherein one of said sloped sides of said thread of said fastener comprises means for compressing said timber of said support between said helical metal insert and said annular zone of said lower surface of said tie plate substantially parallel to said screwing axis.

9. The device defined by claim 8 wherein said predetermined screwing axis is secant with and substantially perpendicular to said upper surface of said support, and wherein said shank is cylindrical in shape and is defined by a cylinder or revolution defined by said predetermined radius and said longitudinal axis of symmetry of said fastener.

10. The device defined by claim 9 wherein said sloped sides of said thread of said fastener form a constant angle with said longitudinal axis of said shank, wherein said sloped sides of said thread have a constant pitch, wherein the shape and dimensions of a cross-section of said section of said thread of said fastener taken along a plane passing through said screwing axis at one point therealong is the same for all cross-sections taking along all planes passing through all points along said screwing axis, wherein the shape and dimensions of a cross-section of said section of said thread of said tapping taken along a plane passing through said screwing axis at one point therealong is the same for all cross-sections taken along all planes passing through all points along said screwing axis.

11. The device defined by claim 10 wherein said angle and pitch of said sloped sides of said fastener are substantially equal to the angle and pitch of said thread of said helical tapping of said support, respectively, and wherein said insert has a constant pitch and wherein said insert comprises a substantially rectangular section having a cross-section of the same shape and dimensions for all planes passing through said screwing axis at all points therealong, wherein said pitch of said insert is substantially equal to said pitch of said thread of said fastener.

12. The device of claim 11 in combination with said support.

13. The device defined by claim 12 wherein said upper portion of said helical tapping is defined by an upper generatrix, a lower generatrix, and a base generatrix, wherein said upper and lower generatrices are both substantially rectilinear and substantially perpendicular to said screwing axis and are spaced apart by a predetermined height, wherein said base generatrix is substantially rectilinear and is substantially parallel to said screwing axis, and is spaced from said screwing axis by a distance greater than said maximum radius of said thread of said fastener and by a distance substantially equal to the radius of a circular periphery of said annular zone of said lower surface of said tie plate, wherein said lower portion of said helical tapping is contiguous with said upper portion and is defined by a base generatrix and a lower generatrix, wherein said base generatrix of said lower portion is substantially rectilinear and is substantially parallel to said screwing axis and is spaced from said screwing axis a distance intermediate between said maximum radius of said thread of said fastener and the distance separating said screwing axis from said base generatrix of said upper portion wherein said lower generatrix of said lower portion of said tapping has a configuration permitting positioning of said section of said thread of said fastener in said lower portion of said helical tapping, wherein said section of said metal insert is defined by an upper generatrix, a lower generatrix, an interior radial generatrix, and an exterior radial generatrix, wherein said upper and lower generatrices are substantially rectilinear and substantially perpendicular to said screwing axis, and are spaced apart by a distance substantially equal to said distance separating said upper and lower generatrices defining said upper portion of said helical tapping, wherein said interior radial generatrix is substantially rectilinear and substantially parallel to said screwing axis and is spaced from said screwing axis at a distance greater than said radius of said shank of said fastener, wherein said exterior radial generatrix is substantially rectilinear and is substantially parallel to said screwing axis and is spaced from said screwing axis at a distance greater than the distance separating said screwing axis and said base generatrix of said lower portion of said tapping and less than the distance separating said screwing axis from said base generatrix of said upper portion of said tapping, wherein said insert is positioned in said upper portion of said tapping so as to produce radial play of said helical metal insert with respect to said base generatrix of said upper portion of said tapping.

14. The device defined by claim 13 wherein said radial play is less than 0.5 mm.

15. The device defined by claim 14, wherein the ratio of said pitch of said metal insert and twice said radius of said periphery of said borehole is at most equal to 0.55.

16. The device of claim 15 wherein the ratio between the height of said metal insert and said pitch of said metal insert is approximately equal to 0.25.

17. A device for attaching a rail on an upper, substantially planar surface of a timber support, wherein said rail comprises a flange, said support comprising a borehole having a radius adapted to accommodate a shank of a fastener and a helical tapping comprising an upper portion and a lower portion, wherein said upper portion comprises along the length thereof an interior end and an exterior end wherein said exterior end is further from said shank than said interior end, and wherein said lower portion comprises an interior end and an exterior end along the length thereof, wherein said device comprises:

(a) at least one fastener adapted to be screwed into said support along a predetermined screwing axis, said fastener comprising a shank defined by a predetermined radius, and a longitudinal axis of symmetry coincident with said screwing axis and a helical thread comprising a section comprising at least one sloped side sloped with respect to said longitudinal axis of said shank, wherein said at least one sloped side has a maximum predetermined radius with respect to said axis of said shank, wherein said predetermined radius of said shank is substantially equal to said radius of said borehole, wherein the pitch of said thread of said fastener is substantially equal to the pitch of said helical tapping, wherein said helical thread of said fastener has a shape permitting placement of said helical thread in said lower portion of said helical tapping;

(b) an elastic helical metal insert adapted to be screwed into said helical tapping, wherein said insert comprises a flat metal strip having a substantially rectangular cross-section, wherein said helical metal insert is adapted to be placed in a rest position, wherein in said rest position said insert has a constant pitch and the shape and dimensions of a cross-section of said insert taken along a plane passing through said screwing axis is the same for all cross-sections of said insert taken through all planes passing through said screwing axis at all points therealong, wherein said pitch of said helical metal insert corresponds to said pitch of said thread of said fastener, wherein said insert comprises a substantially rectangular section wherein the height of said insert is substantially equal to the height of said upper portion of said helical tapping, wherein said insert comprises an interior end nearest to said screwing axis and an exterior end furthest from said screwing axis, wherein said section of said insert is positioned in said upper portion of said helical tapping so that said interior end is positioned at a distance from said longitudinal axis of said fastener substantially equal to said radius of said shank of said fastener, and said exterior end of said insert is positioned at a distance from said screwing axis intermediate between said exterior end of said lower portion of said helical tapping and said exterior end of said upper portion of said helical tapping thereby producing radial play between said insert and said exterior end of said upper portion of said helical tapping.

18. The device defined by claim 17 in combination with said support.

19. The device defined in claim 17 further comprising a tie plate having an upper surface and a substantially planar lower surface adapted to rest flatly on the upper surface of said support, wherein said tie plate comprises at least one hole extending through said tie plate and having a radius at least as great as said maximum radius of said thread of the fastener so as to comprise means for receiving said fastener.

20. The device defined by claim 19 wherein said head of said fastener comprises an annular shoulder extending around said longitudinal axis of said shank adapted to press on said flange of said rail, wherein said lower surface of said tie plate further comprises at least one annular zone surrounding said at least one hole of said tie plate on all sides thereof, wherein said upper surface of said support comprises at least one annular zone surrounding said borehole of said support on all sides thereof wherein said circular periphery of said annular zone of said hole of said support comprises said helical tapping.

21. The device defined by claim 20 wherein one of said sloped sides of said thread of said fastener comprises means for compressing said timber of said support between said helical metal insert and said annular zone of said lower surface of said tie plate substantially parallel to said screwing axis.

22. The device defined by claim 20 wherein said predetermined screwing axis is secant with and substantially perpendicular to said upper surface of said support, and wherein said shank is cylindrical in shape and is defined by a cylinder of revolution defined by said predetermined radius and said longitudinal axis of symmetry coincident with said screwing axis.

23. The device defined by claim 22 wherein said sloped sides of said thread of said fastener form a constant angle with said longitudinal axis of said shank, wherein said sloped sides of said thread of said fastener have a constant pitch, wherein the shape and dimensions of said section of said thread of said tapping and said fastener taken along a plane passing through said screwing axis at one point therealong is the same for all cross-sections taken along all planes passing through said screwing axis at all points therealong.

24. The device defined by claim 23 wherein said angle and pitch of said sloped sides of said fastener are substantially equal to the angle and pitch of said thread of said helical tapping of said support, respectively, and wherein said pitch of said insert is substantially equal to said pitch of said thread of said fastener.

25. The device defined by claim 24 in combination with said support.

26. The device defined by claim 25 wherein said upper portion of said helical tapping is defined by an upper generatrix, a lower generatrix, and a base generatrix, wherein said upper and lower generatrices are both substantially rectilinear and substantially perpendicular to said screwing axis and are spaced apart by a predetermined height, wherein said base generatrix is substantially rectilinear and is substantially parallel to said screwing axis, and is spaced from said screwing axis by a distance greater than said maximum radius of said thread of said fastener, and by a distance substantially equal to said radius of a circular periphery of said annular zone of said lower surface of said tie plate, wherein said lower portion of said helical tapping is contiguous with said upper portion and is defined by a base generatrix and a lower generatrix, wherein said base generatrix of said lower portion is substantially rectilinear and is substantially parallel to said screwing axis and is spaced from said screwing axis by a distance intermediate between said maximum radius of said thread of said fastener and the distance separating said screwing axis from said base generatrix of said upper portion, and wherein said lower generatrix of said lower portion of said tapping has a configuration permitting positioning of said section of said thread of said fastener in said lower portion of said helical tapping, wherein said section of said metal insert is defined by an upper generatrix, a lower generatrix, an interior radial generatrix, and an exterior radial generatrix, wherein said upper and lower generatrices are substantially rectilinear and substantially perpendicular to said screwing axis and are spaced apart by a distance substantially equal to said distance separating said upper and lower generatrices defining said upper portion of said helical tapping, wherein said interior radial generatrix is substantially rectilinear and substantially parallel to said screwing axis and is spaced from said screwing axis at a distance substantially equal to said radius of said shank of said fastener, and wherein said exterior radial generatrix is substantially rectilinear and is substantially parallel to said screwing axis and is spaced from said screwing axis by a distance intermediate between said base generatrix of said lower portion of said section of said thread of said tapping and said base generatrix of said upper portion of said section of said thread of said tapping, wherein said insert is positioned in said upper portion of said section of said thread of said tapping so as to produce radial play of said helical metal insert with respect to said base generatrix of said upper portion of said section of said thread of said tapping.

27. The device defined by claim 26 wherein said radial play substantially equal to 0.5 mm.

28. The device defined by claim 27 wherein the ratio of said pitch of said metal insert to twice said radius of said periphery of said borehole is at most equal to 0.55.

29. The device defined by claim 28 wherein the ratio of the height of said metal insert to said pitch of said metal insert is approximately equal to 0.25.

30. A method for forming a device for attaching a rail on an upper, substantially planar surface of a timber support, said method comprising the steps of:
(a) forming a borehole in said upper surface of said support, wherein said borehole has an inner radius corresponding substantially to the radius of a shank of a fastener adapted to be screwed into said borehole along a screwing axis, wherein said borehole comprises a periphery;
(b) forming a helical tapping in said periphery of said borehole, wherein said helical tapping comprises a thread having a pitch corresponding to said pitch of a thread of said fastener wherein said method further comprises the step of providing said helical tapping with a section comprising a substantially rectangular upper portion and a lower portion contiguous with said upper portion, wherein said upper portion has an exterior end spaced from said screwing axis a distance greater than the maximum radius of said thread of said fastener, wherein said lower portion comprises a portion substantially rectilinear and substantially parallel to said screwing axis at a distance therefrom intermediate between said thread of said fastener and said exterior end of said upper portion, and wherein said lower portion further comprises another portion configured to permit the placement of said thread of said fastener in said another portion of said lower portion of said thread of said helical tapping;
(c) screwing an elastic helical metal insert into said helical tapping, wherein said insert comprises a flat metal strip having a substantially rectangular cross-section, and having a pitch corresponding to the pitch of said thread of said fastener, wherein said method further comprises the step of positioning said insert in said upper portion of said section of said helical tapping, wherein the height of said insert is substantially equal to the height of said upper portion of said section of said helical tapping, and wherein said insert comprises an interior end and an exterior end, wherein said method further comprises the steps of:
(i) positioning said interior end of said insert at a distance from said screwing axis corresponding substantially to the radius of said shank of said fastener; and
(ii) positioning said exterior end of said insert at a distance intermediate between said rectilinear portion of said lower portion of said thread of said tapping and said exterior end of said upper portion of said thread of said tapping, so as to produce radial play between said exterior end of said insert and said exterior end of said upper portion of said helical tapping.

31. The method defined by claim 30 wherein said method further comprises the step of screwing said fastener into said borehole along a predetermined screwing axis.

32. The method defined by claim 31 wherein said predetermined screwing axis is secant with and substantially perpendicular to said upper surface of said support, wherein said method further comprises the step of providing said fastener with a cylindrical shaft extending around said screwing axis having a predetermined radius and providing said fastener with a helical thread comprising a section having a constant pitch, wherein said method further comprises the step of providing said section with two sloped sides sloped with respect to said screwing axis of said shaft and having a maximum radius with respect to said screwing axis, wherein said method further comprises the step of screwing said helical thread of said fastener into said helical tapping of said borehole.

33. The method defined by claim 32 wherein said method further comprises the step of providing said fastener with a head comprising an annular shoulder of revolution around said screwing axis of said shank, wherein said method further comprises the step of pressing said head on the bottom of a flange of said rail.

34. The method defined by claim 33 further comprising the steps of:
forming a hole in said tie plate; passing said fastener through at least one hole in a tie plate before screwing said fastener in said borehole; and resting the lower, substantially planar surface of a tie plate on said upper surface of said support.

35. The method defined by claim 34 further comprising the step of pressing said head of said fastener on the upper surface of said flange of said rail, thereby pressing said flange of said rail against said upper surface of said tie plate.

36. The method defined by claim 34 wherein said method further comprises the step of producing an annular zone on said lower surface of said tie plate surrounding said at least one hole on all sides thereof.

37. The method defined by claim 36 wherein step (a) comprises the steps of:
forming a cylindrical borehole in said upper surface of said support, wherein said cylindrical borehole is defined by a cylinder of revolution around said screwing axis and having an inner radius corresponding substantially to said radius of said shank of said fastener; and
forming an annular zone in said upper surface of said support wherein said annular zone surrounds said cylindrical borehole on all sides thereof.

38. The method defined by claim 37 wherein step (b) comprises the step of forming a helical tapping in said circular periphery having a constant pitch and wherein the shape and dimensions of a cross-section of said section of said thread of said tapping taken along a plane passing through said screwing axis at one point therealong is the same for all cross-sections taken along all planes passing through said screwing axis at all points therealong.

39. The method defined by claim 38 wherein step (b) further comprises the steps of:
defining said upper portion by an upper, a lower, and a base generatrix, wherein said upper and lower generatrices are substantially rectilinear and substantially perpendicular to said screwing axis and are spaced apart by a predetermined height, wherein said base generatrix is substantially rectilinear and substantially parallel to said screwing axis and is spaced from said screwing axis by a distance greater than said maximum radius of said thread of said fastener and substantially equal to the radius of said annular zone of the lower surface of said tie plate;
defining said lower portion by a base and a lower generatrix, wherein said base generatrix is substantially rectilinear and substantially parallel to said screwing axis and is spaced from said screwing axis by a distance intermediate between said maximum radius of said thread of said fastener and the distance separating said base generatrix of said upper portion from said screwing axis, wherein said lower generatrix has a configuration permitting said section of said thread of said fastener to be placed in said lower portion of said section of said thread of said thread of said helical tapping.

40. The method defined by claim 39 wherein said method further comprises the steps of:
providing said insert with a section having a constant pitch and the shape and dimensions of a cross-section of said insert taken along a plane passing through said screwing axis at one point along said screwing axis is the same for all cross-sections along all planes passing through said insert and screwing axis taken at all points along said screwing axis; and
defining said section of said insert by substantially rectilinear upper, lower, interior radial, and exterior radial generatrices, wherein said upper and lower generatrices are substantially perpendicular to said screwing axis and are separated by a distance substantially equal to the distance separating said upper and lower generatrices of said helical tapping, wherein said interior radial generatrix is substantially parallel to said screwing axis and is spaced from said screwing axis by a distance substantially equal to said radius of said shank of said fastener, and wherein said exterior radial generatrix is substantially parallel to said screwing axis and is spaced from said screwing axis by a distance intermediate said base generatrix of said lower portion of said section of said thread of said tapping and said base generatrix of said upper portion of said section of said thread of said helical tapping.

41. The method defined by claim 40 further comprising the steps of:
placing said insert into a stressed condition from an unstressed condition, wherein in said stressed condition said insert is in an elastically expanded position after screwing said insert into said helical tapping wherein in said stressed condition said helical metal insert is elastically expanded to an extent less than or at most equal to said radial play; and
returning said metal insert to said unstressed condition before screwing in said fastener.

42. The method defined by claim 41 further comprising the step of producing radial play at most equal to 0.5 mm.

43. The method defined by claim 42 further comprising the step of forming said insert and said borehole such that the ratio of said pitch of said helical metal insert to twice said radius of said periphery of said borehole is at most equal to 0.55.

44. The method defined by claim 43 further comprising the step of forming said insert such that the ratio of the height of said helical metal insert to said pitch of said metal insert is approximately equal to 0.25.

* * * * *